United States Patent [19]

Bauer et al.

[11] 4,332,227
[45] Jun. 1, 1982

[54] INJECTION TIMING DEVICE FOR INTERNAL COMBUSTION ENGINES

[75] Inventors: Otto Bauer, Munich; Leonhard Eberl, Unterschleissheim; Gerhard Geyer, Munich; Max Straubel, Stuttgart, all of Fed. Rep. of Germany

[73] Assignee: Robert Bosch GmbH, Stuttgart, Fed. Rep. of Germany

[21] Appl. No.: 258,095

[22] Filed: Apr. 27, 1981

Related U.S. Application Data

[63] Continuation of Ser. No. 48,554, Jun. 14, 1979, abandoned.

[30] Foreign Application Priority Data

Jun. 19, 1978 [DE] Fed. Rep. of Germany ....... 2826800

[51] Int. Cl.³ ...................... F02M 59/20; F02M 59/32
[52] U.S. Cl. .................................. 123/502; 123/501; 464/2; 464/5
[58] Field of Search ...................... 64/25, 26; 123/502, 123/501; 417/294

[56] References Cited

U.S. PATENT DOCUMENTS

| 3,910,724 | 1/1975 | Okamoto | 123/502 |
| 3,934,430 | 1/1976 | Fuso | 64/25 |
| 4,132,202 | 1/1979 | Hakayama | 123/502 |

Primary Examiner—Charles J. Myhre
Assistant Examiner—Carl Stuart Miller
Attorney, Agent, or Firm—Edwin E. Greigg

[57] ABSTRACT

An injection timing device is proposed for internal combustion engines, by means of which the mutual rotary position of the output shaft with respect to the input shaft can be varied in dependence on the speed and on at least one further operating parameter. The timing device comprises flyweights, operating in dependence on the speed against the force of resetting springs, and hydraulically operated control elements which engage the flyweights, these control elements, which are effective radially toward the outside, being accommodated within the timing element. By changing the position of the control elements, the radial position of the flyweights, which otherwise is determined only by centrifugal force, can be additionally varied in dependence on at least one further operating parameter of the engine, preferably the load, in order to correct the instant of injection.

13 Claims, 6 Drawing Figures

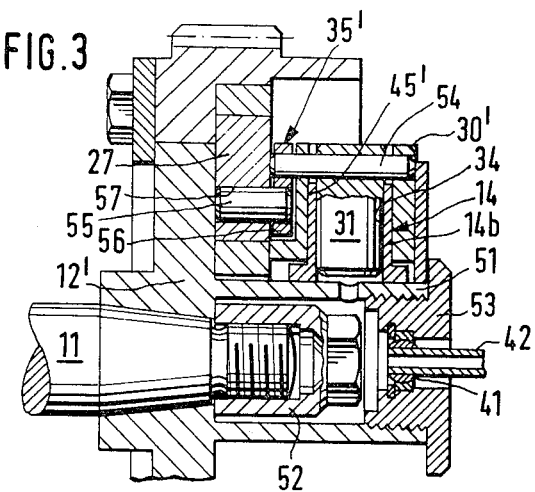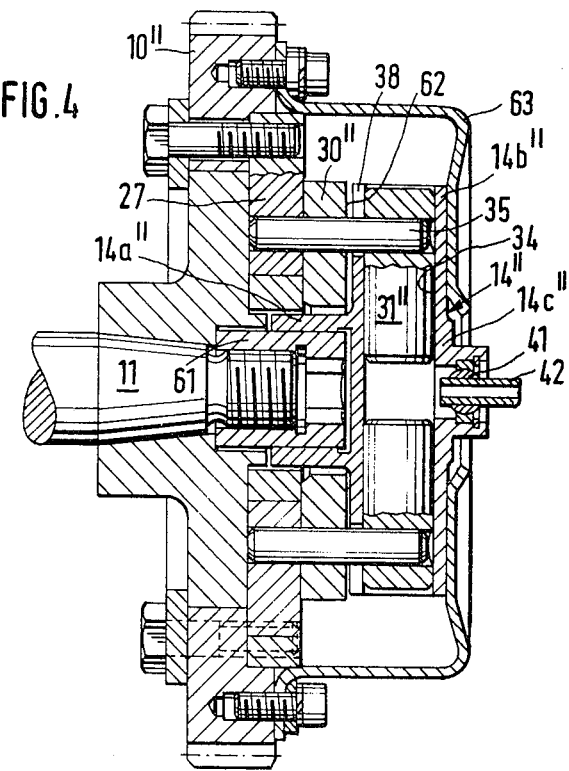

INJECTION TIMING DEVICE FOR INTERNAL COMBUSTION ENGINES

This is a continuation, of application Ser. No. 48,554 filed June 14, 1979, now abandoned.

BACKGROUND OF THE INVENTION

The invention is based on an injection timing device for internal combustion engines of the type described herein and finally claimed. An injection timing device of this type has been known (DOS [German Unexamined Laid-Open Application] No. 2,716,696) wherein the hydraulically operated control elements are constituted by pressure pistons which serve as spring abutments and wherein the hydraulic pressure is variable in dependence on the load. By the feature that the spring abutments can be varied in their position by the pressure pistons, the spring force which counteracts the centrifugal force is in each case varied in proportion to the pressure, which latter is controlled in dependence on the load. Accordingly, the point in time when injection takes place, which is regulated by the timing device, is corrected. However, in this timing device the mass of the flyweights alone determines, and limits, the effective operating capacity. The hydraulic pressure serves solely for adjusting the spring abutments and the correction possible in this arrangement is, furthermore, greatly restricted by the limited installation space for the pressure pistons.

OBJECTS AND SUMMARY OF THE INVENTION

The injection timing device of this invention has, in contrast to the above, the advantages that, due to the fact that the control elements directly engage the flyweights, the operating capacity of the injection timing device is increased, and greater versatility is provided regarding the engagement of the control elements and the installation of the latter. The hydraulic control pressure effective in addition to the centrifugal force serves for the additional incorporation of further operating parameters and can be set or regulated outside of the timing device in a separate control unit. Accordingly, the instant of injection can be adapted to the more sophisticated needs of modern engines, by being dependent, in addition to being dependent on the speed, on one or more additional operating parameters, preferably on the load. Such an additional adaptation is required, above all, because of the improvement in the exhaust gas quality demanded in modern engines.

Advantageous further developments and improvements of the injecting timing device are possible by features recited herein.

By a feature set out, namely a piston carrier supported on a guide member connected to the output shaft, the piston control element can be manufactured and mounted separately from the remainder of the timing device, and a very short construction results from other features. If, in a preferred embodiment, the recesses for the piston carrier are open toward the end face of the timing device, i.e., toward the outside, then the piston control elements which serve for the hydraulic auxiliary control can, with the mechanical injection timing device having been completely installed, be mounted subsequently at the injection timing device. The sliding guide means covered herein for the flyweights avoids errors in the adjusting process by jamming of the flyweights. A piston carrier of a simple construction can be derived from the features herein; and other features make it possible to utilize the installation space for the pistons up to the middle of the timing device, whereby a relatively long guidance for the pistons can be attained and friction of the piston control elements can be additionally reduced. A very simple construction is obtained since the flyweights themselves accommodate the cylinder bores and consequently serve at the same time as hydraulic control elements.

The combination of the timing device of this invention with other features provides a particularly compact structure, and the advantages of the conventional pairs of eccentrics which comprise an adjusting eccentric and a compensating eccentric and disposed within the adjusting gear system enhance, due to their inherent self-locking characteristics, the mode of operation of the injection timing device operated by centrifugal force as well as hydraulically. By the features brought out here, a safe feed of the hydraulic medium practically unaffected by eccentricities is obtained, and other features make it possible to process, additionally to the load, still other operating parameters without having to change the structural size or structural shape of the timing device proper. The invention will be better understood as well as further objects and advantages thereof become more apparent from the ensuing detailed description of preferred embodiments taken in conjunction with the drawings.

BRIEF DESCRIPTION OF THE DRAWINGS

Four embodiments are illustrated in the drawings and explained in greater detail in the following description. In the drawings:

FIG. 3 is a partial longitudinal section through the second embodiment;

FIG. 4 is a longitudinal section through the third embodiment;

DESCRIPTION OF THE EMBODIMENTS

Figure 1:
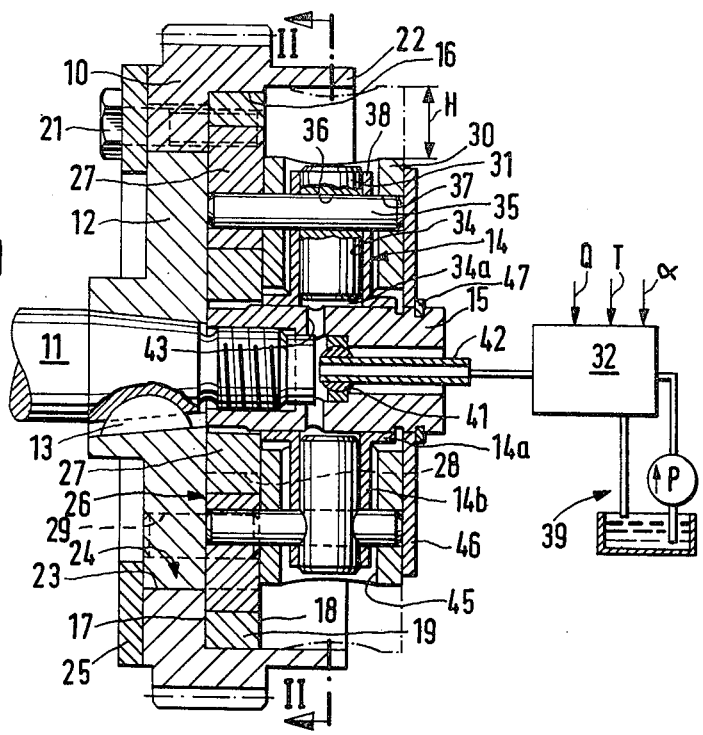
FIG. 1 is a longitudinal section through the first embodiment along line I—I in FIG. 2
Figure 2:
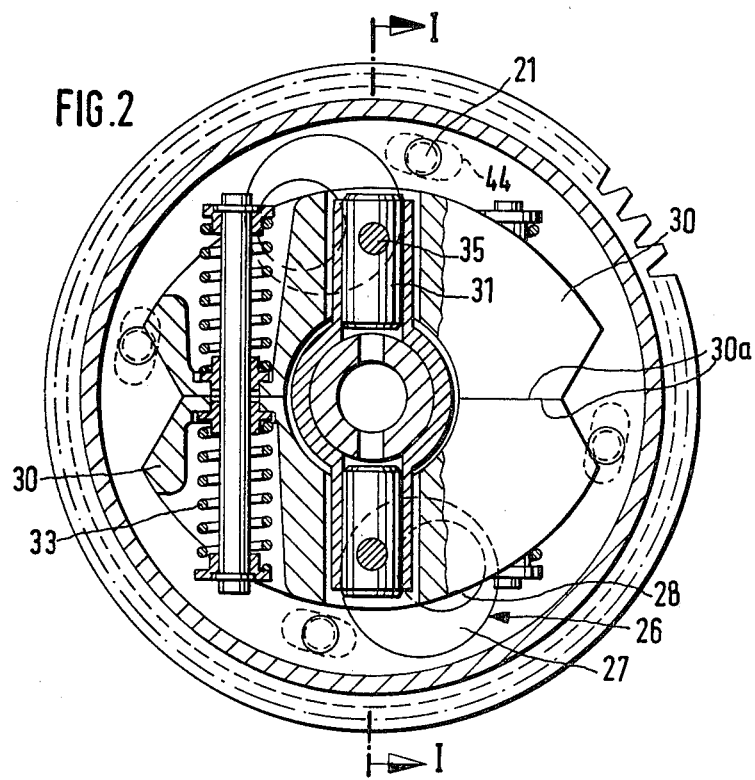
FIG. 2 shows a section along line II—II in FIG. 1.

Turning now to the drawings, the injection timing device for a fuel injection pump for diesel engines illustrated as the first embodiment in FIGS. 1 and 2 is provided as an open-installation injection timing device for mounting in a closed drive casing and/or in the gearbox of the engine.

The injection timing device serves conventionally with its part operated by centrifugal force for the speed-dependent variation of the mutual rotary position of two equiaxial shafts, an input shaft and an output shaft, wherein the output shaft is either at the same time the camshaft of the injection pump or an intermediate shaft coupled therewith; and by the change in the rotary position of both shafts, the instant of injection of the fuel injection pump is varied in dependence on a given variable [parameter].

The input shaft is a drive gear wheel 10, and the output shaft is a camshaft 11 of the fuel injection pump, which latter is not illustrated in detail. The injection timing device can, of course, also be mounted on an intermediate [connecting] shaft coupled with the camshaft of the injection pump. A bearing flange 12 is attached on the camshaft 11 and secured against turning by a disk spring 13, with the aid of a ring nut 15 which serves simultaneously as the guide member for a piston carrier 14 and as the hub for the timing device.

As adjusting disk 19 provided with two plane-parallel end faces 17 and 18 is inserted in a bore 16 of the drive gear wheel 10, this disk being firmly connected to the drive gear wheel 10 by means of screws 21. The drive gear wheel 10 is provided, in the illustrated embodiments, with an integral stop ring 22 which projects beyond the end face 18 of the adjusting disk 19 and thus this element serves as the outer abutment. The function of this stop will be described in greater detail below. A cavity 24, which has the shape of an annular groove and formed by one end face 17 of the adjusting disk 19, a cover disk 25, and a bore 23 in the drive gear wheel 10, receives the bearing flange 12 and thus constitutes an axial and radial bearing for the drive gear wheel 10. The adjusting gear system between the bearing flange 12, which latter is to be considered part of the output shaft 11, and the drive gear wheel 10, which serves as the input shaft, is constituted by two pairs of eccentrics 26 rotatably supported in the adjusting disk 19 which acts as the bearing member. It is to be understood that these eccentric pairs each consist of one adjusting eccentric 27 and one compensating eccentric 28 (FIG. 2). The compensating eccentrics 28 are connected with the bearing flange 12 by means of one pin 29 and serve for compensating for the arc height which would be attained by the centers of the adjusting eccentrics 27 if the latter were to rotate about the pins 29 without compensating eccentrics 28. This rotary motion is effected according to the invention by flyweights 30 and by servo pistons denoted by 31 and operable by the pressure of a hydraulic medium. The servo pistons are guided in an oil-tight manner in radially outwardly oriented cylinder bores 34 of the piston carrier 14 and move away from the ring nut 15 toward the outside in accordance with the pressure of the hydraulic medium controlled by a control means 32, against the force of resetting springs 33 accommodated within the flyweights 30 in a conventional manner. The adjusting eccentrics 27 are rotated during this step by way of connecting pins 35 which eccentrically engage the adjusting eccentrics 27.

The connecting pins 35 which serve as the transmitting elements are firmly pressed into the adjusting eccentrics 27 and are passed in parallel to the longitudinal axis of the timing device and the camshaft 11 through transverse bores 36 in the servo pistons and/or through transverse bores 37 in the flyweights 30. The adjusting movement of the flyweights 30 and the servo pistons 31, which takes place radially toward the outside, is made possible by longitudinal slots 38 that are provided in the walls of the cylinder bores 34 of the piston carrier 14. The outwardly oriented adjusting motion of the flyweights 30 is conventionally effected by the speed-dependent centrifugal force and takes place against the force of the resetting springs 33 which comprise pairs of compression springs. This speed-dependent adjusting motion of the flyweights 30 is superimposed by the settable or controllable adjusting motion of the hydraulically operated servo pistons 31 which serve as the adjusting members. The feed of the hydraulic medium to the servo pistons 31 is regulated externally in the control device 32. Such a regulation can take place, as indicated by the arrows at the control device 32, in dependence on the load Q and/or on an operating temperature T, as well as the actual value of the adjusting angle $\alpha$ characterizing the instant of injection. The associated pressure source is indicated only roughly and denoted by 39. Instead of regulating the hydraulic medium fed to the servo pistons 31, it is also possible for the control device 32 to regulate the pressure of the hydraulic medium in its level in correspondence with the operating parameters of the engine, and in this case the servo pistons 31 are displaced in accordance with the resetting force of the resetting springs 33 proportionally to the pressure and the centrifugal force of the flyweights 30 and thus the adjusting eccentrics 27 are correspondingly rotated. The largest possible stroke H of the servo pistons 31 and of the flyweights 30 and thus the maximum adjustment of the rotary position of the two shafts 10 and 11 with respect to each other is limited by the stop ring 22 which projects beyond the end face 18 of the adjusting disk 19. The flyweights 30 are adapted to abut against the stop ring 22 in their outermost position and this is indicated in dot-dash lines.

The hydraulic medium is fed to the servo pistons 31 via a conduit 42 from the control device 32, this conduit being introduced from the outside into the timing device and being mounted in the axial center of the timing device by means of a fluid-tight ball-and-socket joint 41. The ball-and-socket joint 41 is attached in the interior of the ring nut 15 and compensates for axial displacements between the conduit 42 and the injection timing device. The engine oil fed into the interior of the ring nut 15 and which serves as the hydraulic medium passes via transverse bores 43 in the ring nut 15 into the zones 34a of the cylinder bores 34 constituting the pressure chambers for the servo pistons 31.

In the illustrated initial position the flyweights 30 are under the bias of the resetting springs 33 and rest on one another with mutually facing planar surfaces 30a, so that the starting position of the drive gear wheel 10 which serves as the input shaft is fixedly determined with respect to the camshaft 11 which serves as the output shaft. This initial position can be conventionally set by slotted holes 44 (See FIG. 2) worked into the gear wheel 10 in the region of screws 21.

The piston carrier 14, supported with a hub-like part 14a on the ring nut 15 which serves as the guide member, has two piston carrier arms 14b, which extend radially toward the outside and are arranged to receive the cylinder bores 34. These piston carrier arms 14b are disposed with radial clearance all around within respectively one recess 45 of the flyweights 30. These recesses 45 are constituted in the first embodiment (FIGS. 1 and 2) by radially outwardly extending bores within the flyweights 30. The axial bearing support for the flyweights 30 is taken over, on the one hand, by the adjusting disk 19 and, on the other hand, by a cover disk 46 centered on the ring nut 15 and held by a retaining ring 47 that is attached to the ring nut 15.

The second embodiment according to FIG. 3, which operates in the same way as the first embodiment, differs from the first embodiment essentially by a hub 51 for the timing device attached to the bearing flange, here denoted by 12′, and serves as a guide member for the piston carrier 14, and the bearing flange 12′ is attached by a cap nut 52 onto the camshaft 11 of the fuel injection pump. To establish an oil-tight seal for the adjusting hub 51, the latter is sealed at the end face by a ring nut 53, and the ball-and-socket joint 41 is attached in this ring nut 53 and carries the conduit 42.

The flyweights, denoted by 30', are guided, in a deviation from the first embodiment, on the hollow-cylindrical piston carrier arms 14b of the piston carrier 14, and the recesses 45' in the flyweights 30', which comprise radial bores, are therefore placed by means of sliding fit on the outer surface of the piston carrier arms 14b. Transmission members 35' which comprise connecting pins 54 and 55 arranged at a mutual spacing serve for transmitting the adjusting motion of the servo pistons 31 and of the flyweights 30' to the adjusting eccentrics 27. These connecting pins 54 and 55 are linked by means of a fishplate 56. The connecting pin 54 couples one flyweight 30' with the associated servo piston 31, and the other connecting pin 55 is inserted in a bore 57 of the adjusting eccentric 27. This construction of the transmission member 35' makes it possible to provide a very compact structure for the timing device and provides an advantageous force connection and force transmission from the servo piston 31 and/or from the flyweight 30' to the adjusting eccentric 27.

The third embodiment shown in a longitudinal section in FIG. 4 has a structure different from the abovedescribed embodiments insofar as the piston carrier, denoted by 14", is placed from the end face of the timing device with its hub-like part 14a" onto the cap nut 61 which serves as the guide member, and the piston carrier arms 14b" are received by recesses 62, open toward the end face of the timing device and pertaining to the flyweights denoted by 30". The cylinder bores 34 of the piston carrier 14" are constituted by a continuous transverse bore extending through the central axis. The servo pistons 31" can be extended maximally far inwardly toward the center of the timing device, whereby a very satisfactory guidance of these servo pistons 31" is attained, because the part 14c" of the piston carrier 14" provided with the piston carrier arms 14b" and containing the cylinder bores 34 is located in an axially offset manner with respect to the hub part 14a" and also lies spatially in front of the cap nut 61 which serves as the guide member.

The connecting pins 35 disposed between the servo piston 31" and the adjusting eccentric 27 are extended only unilaterally through a longitudinal slot 38 of the piston carrier arms 14b", so that the wall of the piston carrier arm 14b" can be of a closed construction on the other side and contributes toward an improved guidance of the servo pistons 31". The gear wheel 10" which serves as the input shaft is provided, in a deviation from the above-disclosed embodiments, with a sheet-metal cap 63 forming simultaneously an outer stop for the flyweights 30" and the axial limitation for the timing device, i.e., the flyweights 30" and the piston carrier 14" are guided axially through the sheet-metal cap 63. Besides, the sheet-metal cap 63 also serves as an oil-collecting cap and thus improves the lubrication of the timing device. The ball-and-socket joint 41 of the conduit 42 is attached in the center of the part 14c" of the piston carrier 14" which receives the cylinder bores 34.

Figure 5:
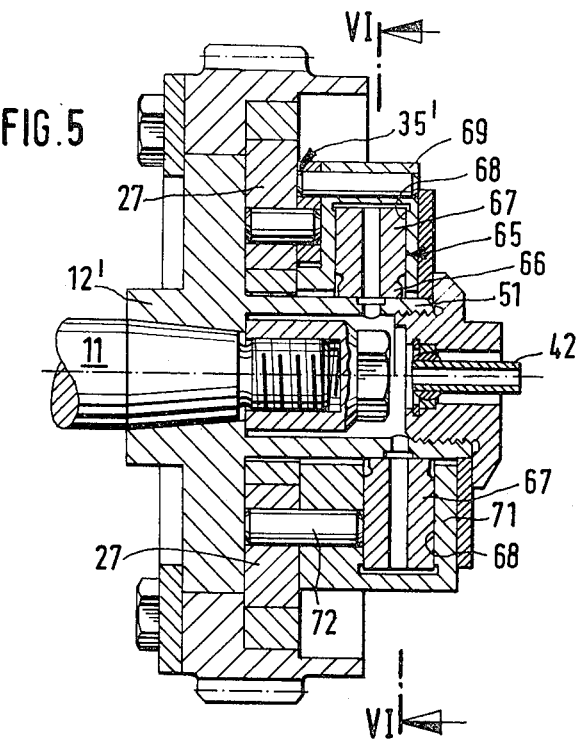
FIG. 5 is a longitudinal section through two modifications of the fourth embodiment along line V—V in FIG. 6.
Figure 6:
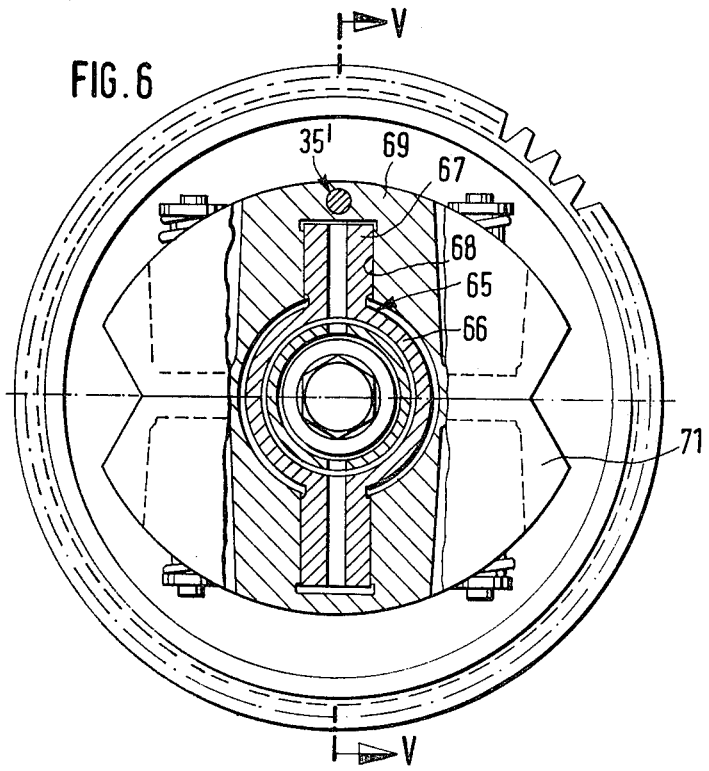
FIG. 6 shows a cross section along line VI—VI in FIG. 5 through the two modifications of the fourth embodiment shown in the latter figure.

The third embodiment shown in FIGS. 5 and 6 in two variants shows, in the upper half of the longitudinal section, one variant and, in the lower half, the other variant. The upper variant differs from the second embodiment of FIG. 3 only by the modified design of a piston carrier 65 supported with a hub-like part 66 on the adjusting hub 51 of the bearing flange 12' which serves as the guide member, this piston carrier 65 being firmly connected to radially outwardly oriented pistons 67. The associated servo cylinders and/or pressure chambers are constituted by cylinder bores 68 within the flyweights, here denoted by the numeral 69. The cylinder bores 68 are arranged as blind holes machined from the center of the longitudinal axis of the timing device radially outwardly into the flyweights 69, so that, with the piston 67 being stationary, the flyweights 69 serve simultaneously as hydraulic adjusting members. The adjusting motion of the flyweights 69 is transmitted to the adjusting eccentrics 27 by transmission members 35', as in the second embodiment in FIG. 3. The second variant in the lower half of FIG. 5 differs from the first variant only by the different articulation of the flyweight 71 which serves as the hydraulic adjusting member. It will be seen that the flyweight 71 is coupled with the adjusting eccentric 27 by means of a connecting pin 72 unilaterally introduced into the flyweight 71. This mode of construction provides a longer guidance of the servo piston 67 in the associated cylinder bore 68 and a simpler and more direct transmission of the adjusting motion to the adjusting eccentric 27. Only the structural length of this variant of the timing device is somewhat larger. The larger flyweight mass of the flyweight 71, however, contributes advantageously toward a higher operating capacity of this timing device. The feeding of pressure oil via conduit 42 takes place as in the second embodiment of FIG. 3.

The mode of operation of the injection timing device according to this invention will now be explained with reference to the first embodiment shown in FIGS. 1 and 2 in a comprehensive description.

In the initial position of the flyweights 30 and servo pistons 31 illustrated in FIGS. 1 and 2, the drive gear wheel 10 which serves as the input shaft assumes a predetermined rotary position with respect to the camshaft 11 which serves as the output shaft and is provided with the bearing flange 12. With increasing speed, an advancement of the instant of injection is operated by the flyweights 30 in a well-known manner. If an additional correction is desired, then the associated adjustment is preprogrammed in the control device 32, and the pressure of the hydraulic medium conveyed by the pressure source 39 is, controlled by the control device 32, applied via the conduit 42 to the servo pistons 31 and adjusts the latter. Thus, the flyweights 30 move radially toward the outside, for a period of time until, with a corresponding rotation of the adjusting eccentrics 27, the bearing flange 12 and thus the camshaft 11 have been rotated with respect to the drive gear wheel 10 to the desired adjusting angle $\alpha$. The control fluid conducted to the servo pistons 31 is controlled, with measurement of the actual value of the adjusting angle $\alpha$, until the desired value and the actual value are identical.

However, it is also possible to directly control the pressure of the hydraulic medium fed via conduit 42 in dependence on the load Q and additional operating parameters, such as the air temperature and/or the coolant temperature T, and to vary this pressure counteracting the resetting force of the resetting springs 33 and supporting the speed-dependent centrifugal force of the flyweights 30. In this case, the servo pistons 31 with the flyweights 30 assume a position, at the point in time where no load is exerted, i.e., at a change of direction of the force of the torque surges, which is determined by the equilibrium between the forces effective at the flyweights 30 and the resetting force of the resetting springs 33. In this connection, the adjusting eccentrics 27 are rotated by a predetermined amount corresponding to the desired relative rotation of the drive gear wheel 10 with respect to the camshaft 11 and being dependent on the speed-dependent centrifugal force of the flyweights 30 in combination with the pressure acting on the pistons 31.

Except for a different construction of the piston carriers and a different force transmission between the servo pistons and the adjusting eccentrics, the embodiments shown in FIGS. 3-6 operate according to the same working principle. In the described hydraulic auxiliary control, it is merely possible to effect an additional advancement setting by means of the pressure signal. For this reason, the centrifugal force adjustement must be maintained below the desired value so that, in case of normal adjustment, i.e., without correction of the control signal dependent on an operating parameter, a positive control pressure can already be allowed to act on the piston, which pressure can then be modulated in the upward or downward direction depending upon requirements.

The above-described centrifugal timing device which operates with an hydraulic auxiliary control can also be used as a control member for an electronically controlled injection timing mechanism and has the advantage, in this connection, that if the electronic circuit fails, the speed-dependent, centrifugal-force-operated adjustment remains preserved, so that the engine, apart from a somewhat poorer smoke characteristic, remains fully in operation and no damage to the engine can occur.

The foregoing relates to a preferred embodiment of the invention, it being understood that other embodiments and variants thereof are possible within the spirit and scope of the invention, the latter being defined by the appended claims.

What is claimed and desired to be secured by Letters Patent of the United States is:

1. Injection timing device for diesel combustion engines provided with flyweights which operate in dependence on the engine speed against the force of resetting springs, said device further including an adjusting gear system for connecting an input shaft with an output shaft, said shafts further having a mutually variable rotary position, each said flyweight being directly coupled with one hydraulically operable control element, and said control element arranged to directly change the position of said flyweight, under the force of the pressure of the hydraulic medium which is variable in dependence on at least one operating parameter of the engine, further wherein said hydraulic control elements are mounted within said timing device perpendicular to the longitudinal axis of said input shaft so that they directly engage the flyweights and act radially outwardly resulting from increasing pressure on said control elements and further wherein said control elements move simultaneously with said flyweights to modify the position of said flyweights to correct the instant of injection.

2. Injection timing device according to claim 1, further wherein said control elements include servo pistons which are guided in a piston carrier provided with associated cylinder bores and said piston carrier being supported on a guide member connected to the output shaft.

3. Injection timing device according to claim 2, further wherein said flyweights are each provided with bore means and one piston carrier is arranged in each said bore means.

4. Injection timing device according to claim 3, further wherein said piston carrier includes radially outwardly oriented, hollow-cylindrical arms said arms including an outer surface which serves as a sliding guide means for the flyweights.

5. Injection timing device according to claim 2, further wherein said guide member includes means for supporting said piston carrier and said cylinder bores are formed by a transverse bore which extends crosswise through the longitudinal axis of said timing device.

6. Injection timing device according to claim 5, further wherein the said means in said guide member and a section provided on said piston carrier which receives said cylinder bores are axially offset relative to one another.

7. Injection timing device according to claim 1, further wherein said control elements include pistons which are connected fixedly with a piston carrier supported on a guide member, said guide member further being connected to said output shaft.

8. Injection timing device according to claim 4, further wherein said flyweights are provided with cylinder bores which extend from the center of the longitudinal axis of said timing device radially outwardly thereof.

9. Injection timing device according to claim 1, further wherein said adjusting gear mechanism further includes a pair of eccentrics comprising an adjusting eccentric and a compensating eccentric, said pair of eccentrics being disposed in a bearing member firmly connected to one of said shafts, and further wherein said adjusting eccentrics are coupled by means of transmitting members to said flyweights as well as to said hydraulic control elements.

10. Injection timing device according to claim 9, further wherein said transmitting members which serve as the coupling means between said control elements and said adjusting eccentrics, are provided with connecting pins arranged in parallel to the longitudinal axis of the timing device.

11. Injection timing device according to claim 10, further wherein one of said connecting pins is connected, via a fishplate, with a second of said connecting pins.

12. Injection timing device according to claim 1, further wherein said hydraulic medium is fed to pressure chambers associated with said control elements by means of a conduit which projects into said timing device and is mounted in the axial center of the latter by means of a fluid-tight ball-and-socket joint.

13. Injection timing device according to claim 1, further wherein said pressure of said hydraulic medium fed to the control elements is determinable by a control device arranged outside of the timing device in dependence on the load (Q) and/or on further operating parameters (T) of the engine.

* * * * *